United States Patent [19]

West et al.

[11] Patent Number: 5,009,111
[45] Date of Patent: Apr. 23, 1991

[54] DIFFERENTIAL FORCE BALANCE APPARATUS

[75] Inventors: Paul West, Glendale; Mirik Hovsepian; Ronald Thomas, both of Pasadena, all of Calif.

[73] Assignee: Quanscan, Inc., Pasadena, Calif.

[21] Appl. No.: 239,365

[22] Filed: Aug. 31, 1988

[51] Int. Cl.$^5$ .......................... G01L 1/08; G01P 15/13
[52] U.S. Cl. ................................. 73/862.61; 73/517 B
[58] Field of Search ................. 73/517 B, 862.61, 701; 250/306, 307

[56] References Cited

U.S. PATENT DOCUMENTS 3,229,530 1/1966 Wilcox et al. ...................... 73/517 B
4,618,767 10/1986 Smith et al. ....................... 250/306 X
4,762,996 8/1988 Binning et al. ....................... 250/306

OTHER PUBLICATIONS

Smith et al.-"Ultrasmall Scanning Tunneling Microscope ... Storage Dewar", Rev. Sci. Instrum., vol. 57, No. 10, 10/1986, pp. 2630-2631.

*Primary Examiner*—Charles A. Ruehl
*Attorney, Agent, or Firm*—Fulwider, Patton, Lee & Utecht

[57] ABSTRACT

A force measurement apparatus that provides means to compensate for thermal or other disturbances. The apparatus utilizes non-contact electron transfer mechanisms to provide indications of force sensed on a test mass. A plurality of electrodes are used in a differential measurement mode to provide self-zeroing and distortion compensation.

20 Claims, 3 Drawing Sheets

DIFFERENTIAL FORCE BALANCE APPARATUS

BACKGROUND OF THE INVENTION

1. Field of the Invention

The present invention relates to a family of transducers such as accelerometers and pressure transducers and more specifically to electromechanical sensors that utilize the principles of non-contact electron transfer mechanisms as the primary sensing element. The methods described herein are appropriate to the measurement of acceleration, pressure, force, torque and angular rate, and more generally to the measurement of any parameter where the input measured can be mechanically converted to a linear motion.

2. Description of the Related Art

As the modern technology of vehicles and moving machinery has advanced, it has become increasingly important to accurately measure the performance of such machinery. Feedback transducers are also employed in the automatic control of high performance machines. Furthermore, as the performance of such systems has increased, the demands on the sensors for accuracy and wide dynamic range have also increased.

Early sensors for measurement and control commonly employed mechanisms for converting the input parameter to a fairly large mechanical motion (e.g. spring mass systems for accelerometers and Bourdon tubes or diaphragms for pressure transducers) and a potentiometer or variable reluctance position sensor to detect the motion of the mass or Bourdon tube, thereby deriving an electrical signal proportional to the input measured. Later developments included the use of strain gages, both metallic and semiconductor, as the primary sensing mechanism, thus greatly extending the dynamic range of such systems. The introduction of closed loop or force balance sensors improved the accuracy of the sensors by orders of magnitude, but incur the penalty of decreased frequency response. Typical force balance sensors employ a sensitive motion detector (commonly a differential capacitor detector) and feedback of the amplified output to a force generating member (commonly a magnetic coil or solenoid) to balance the force created by the input measured. The principal advantage of closed loop sensors is their long term stability and inherent rejection of secondary inputs Since the restoring force acts to return the mechanism to near zero measured position, errors due to stability and linearity of the primary sensing mechanism are minimized.

Increasing sophistication of the apparatus employing sensing transducers, such as aircraft and space vehicles has placed heavy demands on the transducers for improved accuracy, precision and frequency response. In evaluating the relative "goodness" of various sensing mechanisms, it is convenient to examine a "figure of merit" which is the product of its sensitivity times the square of its frequency response. This figure of merit tends to be a constant for any given sensing system, thus it is possible to trade off sensitivity for frequency response and visa versa. To gain improvements in both sensitivity and frequency response it is necessary to innovate more efficient sensing mechanisms. In addition, the more stringent demands of the applications always tend toward to a "perfect transducer," that is, one that is perfectly accurate, has unlimited frequency response and that removes zero energy from the system being measured.

As the modern technology of vehicles and moving machinery has advanced, it has become increasingly important to accurately measure the forces experienced by systems and components. Furthermore, the performance of such systems has steadily increased, thereby placing greater demands on the accuracy and dynamic range of force measurement techniques. For example, the instruments developed to measure acceleration, generally designated as accelerometers, are a specific example of this class of instruments and have been designed in many different forms for various applications. Motion technology has developed the design of the accelerometer to meet the need for more reliable acceleration measurements, especially in dynamic ranges that were previously absent, unattainable or not of interest.

Among the practical applications of the accelerometer have been research into the dynamics of aircraft, spacecraft, and other higher performance moving vehicles to help understand the stresses and vibrations that can develop within the structures while undergoing acceleration. Other specifically designed accelerometers have been developed to detect earthquakes, control vibration test equipment, and instrument the test of products that are subject to sizable and often rapidly encountered accelerative forces. The accelerometer has also gained widespread use as an input source for advanced navigation and inertial guidance systems that utilize computers to determine guidance commands. In this application, the role of the accelerometer has changed from merely measuring acceleration for later analysis to actively forming a vital component in a system that controls the movement of a guided vehicle such as a missile, aircraft or spacecraft. In order to accommodate these and other demanding applications, the accelerometer must be rugged, accurate and have a large dynamic range while being capable of providing an output that can easily and accurately determine the acceleration of the test body or system.

While many accelerometers have been developed for a variety of applications, the most common designs utilize the same basic principles for measuring acceleration. An accelerometer is said to measure acceleration, but this statement is not quite true for methods commonly used to measure acceleration, since acceleration cannot easily be measured directly. Rather, an accelerometer usually measures the force exerted by restraints that are placed on a test mass that is subject to inertial forces when the accelerometer assembly is attached to an accelerating body. The acceleration can then be computed using the relationship between the restraint force and acceleration as defined by Newton's second law, namely $F = Ma$ (force equals mass times acceleration). In most accelerometers, an electronic circuit is used to detect and measure the forces being exerted on the mass. Usually, the electric circuit is designed to measure the displacement of the test mass within its housing, since displacement of the mass restrained by an elastic member is proportional to the acceleration of the accelerometer system. For the most part, the design differences between most accelerometers are primarily the various ways in which the forces may be measured and converted to a proportional electrical signal.

Many accelerometer designs have been developed throughout the years due to the difficulty in adapting a particular design to the dynamic range and accuracy requirements of different applications. For example, some accelerometers may be used in extremely high-g ranges which would make highly sensitive accelerometers developed for other purposes, for instance, seismology unusable. When acceleration measurements are required for a system subject to many hundreds of times the force of gravity, or "g," piezoelectric accelerometers are often used. A piezoelectric accelerometer utilizes a test mass that is cemented to a piezoelectric crystal which is in turn cemented to a case or housing. The piezoelectric crystal supports the test mass and is strained in a predictable manner during acceleration. The stresses induced by the acceleration cause the crystal to generate a voltage which is proportional to acceleration.

Piezoelectric accelerometers are particularly noted for their small size and large dynamic range, which can be up to 5,000 g. For this reason, they are particularly useful in missile or spacecraft guidance systems that undergo very high accelerations.

While accelerometers are very useful for a wide variety of applications, there are a number of disadvantages associated with presently available instruments. For example, many of the electromechanical components used in accelerometers can be influenced by adverse ambient conditions, such as thermal fluctuations, which can alter the accuracy of the device and cause the accuracy to vary from 1 to 5%. Certain accelerometer designs can be made to have great sensitivity but because of this greater sensitivity, such accelerometers are susceptible to external, uncontrollable forces which may disable or reduce the accuracy of the device. In general, extremely accurate accelerometers are not readily used in applications which require the measurement of high-g accelerations. Therefore, the engineer or designer may have to use another, less sensitive accelerometer design in order to operate in a desired dynamic range.

Therefore, there is a need for a force sensing device which can operate at either a high or low acceleration environment and yet provide accurate measurements of forces experienced by a system or component. Such force measured devices would have wide application in modern systems, but would be particularly applicable to high performance accelerometers. Preferably, such an accelerometer must be rugged, durable, and small in size, especially if the accelerometer is to be used in applications involving guidance systems for missiles, spacecraft and other similar high-performance vehicles. The device must also preferably be relatively inexpensive to manufacture in order to reduce the total cost of any system of which it is a part. Additionally, the electronic circuitry needed to operate the device should be relatively simple to reduce the cost of manufacturing a commercial unit. Also, it would be desirable if the device could easily compensate for thermal expansion or contraction caused by temperature variations in the environment in order to eliminate errors in measurement associated with such thermal effects.

SUMMARY OF THE INVENTION

The present invention provides an improved sensor that is capable of indirectly measuring force and other force-related quantities such as pressure, strain, acceleration, torque, etc., by employing a pair of mechanisms that use non-contact electron transfer mechanisms to act as the primary sensing means. The sensor has a number of practical applications, especially since it can be configured into a relatively compact package which is especially beneficial for numerous military and aerospace applications. The sensor is also capable of being used under high-dynamic conditions, such as high-g environments, which would usually disable most similar prior art sensing devices. Thus, the present invention represents a rugged and easily constructed force balance apparatus or sensor that exhibits high accuracy, tolerance to high-g accelerations, which can be constructed using readily available technology and which represents a substantial improvement over many current force measurement systems.

The present invention provides a highly sensitive, accurate force balance apparatus which can withstand high-g acceleration, yet is compact, easily fabricated and utilizes an electrical circuit system which is simple and inexpensive to construct. The invention utilizes the principle of non-contact electron transfer effects of the type first applied to the scanning tunneling microscope. Non-contact electron transfer effects (NCETE) can exist in a variety of geometries, but all include the ability to propagate electrons across an empty space between the surfaces of two objects. This ability to propagate electrons from one surface to another occurs when the surfaces are placed very close to one another and is particularly effective when one surface is formed into a probe that is placed within a few angstroms of an essentially planar surface. Electron propagation occurs when a small voltage is placed across the probe and surface. Such non-contact propagation can take a variety of forms, depending upon the geometry of the area between the two objects and other intrinsic and extrinsic characteristics of the surfaces and electronic arrangement. It is generally recognized that tunneling currents will exist when the distance between the tip of a probe and an adjacent surface is less than 15 angstroms, but not yet in contact with the surface. For distances greater than 15 angstroms, certain other effects such as the Schottkey effect and Field effect are present and result in similar characteristics related to the propagation of electrons.

Systems which uses NCETE to measure distance keep the current between surfaces constant by incorporating a feedback loop that continually moves the surfaces to maintain a constant distance and thereby to maintain a constant current. The change in voltage in the feedback loop can then be measured to determine the amount of displacement between the two objects.

The present invention, by applying a somewhat similar principle to a force-measuring sensor, detects and determines external forces that are applied on a pair of elastically suspended test masses. The invention measures the external force acting on each test mass by creating an equal and opposite force that repels the external force to maintain the test mass at a constant distance away from a stationary reference. This opposing force is measurable through electric circuits that utilize non-contact electron transfer emissions as a means for detecting when the external force is applied to the test mass. The external forces are determined by measuring the voltage change within the electrical circuits used in combination with the present invention and further utilizing a novel differential amplifier means whereby the two measured voltages are summed to obtain an output that is actually two times the external force acting on the test masses of the apparatus.

In its most general form, the present invention includes a pair of sensing mechanisms, each including a reference or test mass that is elastically suspended and is subject to external forces such as inertial or gravitational forces generated by an acceleration. The test mass includes an electrically conductive means, such as a probe or electrode, that is continuously maintained a constant distance apart from a second electrically conductive means, usually a similar electrode. This second electrode is designed to remain stationary and is usually affixed to a reference mass or member that is essentially unaffected by external forces.

Each mechanism includes a means for providing a current between the probe and electrode. The probe and electrode are continuously maintained a constant distance apart, which also creates a constant level of current in order to achieve the desired non-contact electron transfer emission between the probe and electrode. The distance between the probe and stationary electrode will determine which electron transfer effect will occur. For example, if the probe is maintained approximately 10 angstroms away from the electrode, a tunneling emission will occur. A distance of about 15 angstroms is usually the maximum length at which tunneling effect occurs. If the distance is increased from about 20 to 500 angstroms, either field emission or Schottky emission will be attained. The electron transfer effect to be used may depend on such factors as the expense in creating a structure that will maintain the probe and electrode the desired distance apart. For instance, the use of field emission and Schottky emission may be more desirable since each effect allows a larger distance between probe and electrode which is much easier to obtain and to maintain. The use of larger gap than that needed to promote tunneling currents between probe and electrode does not provide an adverse effects to the present invention nor does it diminish its sensitivity or accuracy.

Each sensing mechanism further includes means for maintaining the constant distance between the probe and electrode when an external force is impinging on the test mass. These maintaining means are operatively linked with the current providing means to provide a constant reaction against external forces operating on one test mass. If an external force is generated on the test mass, in the absence of a maintaining means used in accordance with the present invention, then the force would normally move the probe either toward or away from the stationary electrode. The maintaining means in cooperation with the current providing creates an equal but opposite force that opposes the external force impinging on the test mass in order to maintain the constant distance between the probe and electrode. A measurable voltage change is experienced within the current providing means which is proportional to the magnitude of the external force.

In practice, the external force either moves the probe towards or away from the stationary electrode for an extremely short duration at which point the distance changes and results in an alteration in the current between probe and electrode. The maintaining means detects the change in current and compensates by actually moving the probe in an equal but opposite direction to maintain the constant distance. This counter-movement is performed almost instantaneously upon the application of the external force due to the extremely high frequency response of the detection system used in accordance with the present invention. This rapid response is directly attributable to the use of non-contact electron transfer emissions which detect changes in the constant distance as small as one angstrom and thus can quickly signal the appropriate counter-movement.

The present invention utilizes a pair of test mass and sensing mechanisms in order to twice independently measure the external force impinging on the test mass. Generally, each test mass is situated in relation to the other so that one test mass and probe experiences the force in a direction extending towards the electrode and the other test mass is situated so that it and its probe experiences the force such that the probe is moving away from its corresponding electrode. The use of these two separate sensing mechanisms results in two distinct voltage changes which can be inputed into a differentiating means that sums the two voltage signals to produce an output as great as that sensed by a single probe and electrode. The differentiating means is usually a differential amplifier which directly links with each mechanism to measure the magnitude of the external force. This differentiating concept is particularly advantageous and has important benefits since the reading from the differential amplifier will be zero when there is no force acting on the test mass. A zero reading is thus obtained even though the two sensing mechanisms are actually inputting two voltages into the differential amplifier, but since the two voltages are designed to be the same during non-acceleration, they will cancel other out to produce zero output. If the apparatus is being used as a differential force measurement device, and as a pressure transducer, the output will be the difference between the voltage sensed by the measurement part of the circuit associated with the quantity to be measured and the calibration portion of the circuit that is not being exposed to the force to be measured.

In a preferred embodiment of the present invention, the maintaining means and current providing means cooperate to define an electromechanical feedback system which includes an electromechanical component that is operatively linked with an electrical feedback loop circuit that is used to help maintain the constant current and distance between the probe and electrode. This electromechanical component, such as a piezoelectric device, is attached to the probe and is operable by the feedback loop circuit to maintain the probe at the constant distance away from the electrode. In fact, this electromechanical component can actually be the test mass itself, provided that it is elastically suspended away from the stationary electrode. The feedback loop circuit used in accordance with this electromechanical component has a dynamic response a number of orders of magnitude greater than the response time of the test-mass-elastic-restraint combination to maintain the current at an essentially constant value even when the test mass is being operated upon by an external force.

The electrical feedback system used in accordance with the present invention may be a simplified feedback loop circuit which drives the electromechanical element to maintain the probe a constant distance away from the stationary electrode. When the test mass experiences an external force which moves the probe toward or away from the stationary electrode, the feedback loop senses the change in gap distance and resulting current and compensates for it by moving the electromechanical component the necessary distance to maintain a constant distance and current. In one preferred embodiment, the current requires the probe to be placed between 10 and 500 angstroms away from the electrode, depending upon the non-contact electron transferring effect used. The varying voltage change in the feedback loop circuit, which maintains the current, is an indirect measure of the magnitude of the force that acted on the test mass. By measuring the voltage change in the feedback loop circuit, one can thereby derive force measurements.

In a preferred embodiment, the present invention may also use a symmetrical test mass which results in more accurate measurements. A preferred form includes the test mass having a cylindrical shape and having its outer peripheral edge restrained to achieve maximum displacement at the center of the mass. A cylindrically shaped reference member with centrally mounted electrodes can be placed in close proximity to each of the probes found on the test mass. The resulting structure creates a more accurate sensor, since the forces acting on the test mass are more equally measured by both feedback systems.

This differential concept underlying the present invention, may also be used to compensate for possible thermal expansion or contraction which can operate on the test mass, the reference member, or the base housings used to mount the components. Extreme thermal changes can cause the materials making up the components to expand or contract. For example, if an unsymmetrical test mass is being used and is subject to high thermal changes, an expansion or contraction may be detected by the electromechanical feedback systems and possibly interpreted as an external force. The use of the two test masses with separate electromechanical feedback systems adjusts for any expansion or contractions of the components by adjusting the electromechanical components to maintain the probes and electrodes at the same gap distance. The new voltage readings should be the same in both systems and will produce a zero output reading from the differential amplifier. In this fashion, thermal expansion or contraction can be compensated by using the two separate test masses and sensing mechanisms. As a result, the present invention can be used in applications which may be susceptible to various thermal fluctuations and will reduce the probability of a false reading created by an external force tending to distort the system as a whole.

The use of two probes and electromechanical feedback systems has important benefits for an accelerometer sensor incorporating the invention, since the reading from the differential amplifier will be zero when there is no acceleration. Even though the circuits are actually inputting two voltages into the differential amplifier, since the two voltages in the circuits are the same during non-acceleration, the two voltages will each cancel each other out to produce zero output.

In another preferred embodiment, the present invention may use a symmetrical test mass-constraint assembly which results in more accurate displacement measurements. A preferred form utilizes a cylindrical test mass restrained along its outer peripheral edge to achieve maximum displacement at the center of the mass. Cylindrically-shaped electromechanical components with centrally mounted probes can be similarly restrained to measure the deflection or displacement at the center of the mass. The resulting structure creates a more accurate sensor, since the measured displacement should be equally measured by both probes.

This differential concept may also be used to compensate for possible thermal expansion or contraction which can operate on the test mass, the components or the base housings used to mount the components. Extreme thermal changes can cause the materials which make up the components of the present invention to expand or contract. For example, if an unsymmetrical test mass-constraint assembly is subject to thermal changes, an expansion or contraction may be detected by the electromechanical feedback systems and possibly interpreted as a force operating on the test mass. In this embodiment of the present invention, if the apparatus is subjected to thermal changes which cause the components to expand or contract, the two feedback loop circuits will adjust for these changes by moving the probes as needed; however, the two new voltage readings should be the same and the two would again cancel each other to produce a zero output reading from the differential amplifier. In this fashion, thermal expansion can be compensated by the use of two separate movable probes and electromechanical feedback systems. As a result, the present invention can be used in application which may be susceptible to various thermal fluctuations and will reduce the probability of a false reading.

The present invention thus provides an apparatus that is capable of accurate measurement of forces impinging upon a test mass and at the same time compensating for thermal and other effects that distort the geometry of the apparatus. Other features and advantages of the present invention will become apparent from the following detailed description, taken in conjunction with the accompanying drawings, which illustrate, by way of example, the principles of the present invention.

DESCRIPTION OF THE PREFERRED EMBODIMENTS

The present invention is embodied in a force balance apparatus or sensing device that incorporates a plurality of sensing mechanisms that utilize non-contact electron transfer effects, such as tunneling emission, Schottky emission or field emission, to determine the magnitude of an external force impinging on the test mass. Each sensing mechanism utilizes a test mass having a probe than can be positioned near an electrode which is affixed to a reference structure or member that is unaffected by the external force. The sensing mechanism allows an electron transfer to occur upon the application of the voltage between the probe and the electrode. The mechanism includes means for providing a current between the probe and electrode along with means for maintaining a constant distance between the probe and electrode.

A preferred form of these maintaining and current providing means includes an electromechanical feedback system which incorporates an electronic circuit which activates an electromechanical component to provide a means for maintaining the probe a constant distance away from the electrode. The entire apparatus can conveniently be packaged in a housing to allow it to be used in applications requiring a small but durable component.

The present invention has numerous applications in which force or force-related quantities such as pressure, acceleration, strain, and the like need to be measured. For example, the present invention can be utilized as a pressure transducer which will measure the pressure over a given area defined by the test mass. Likewise, the present invention can be utilized to measure strain in a system which undergoes stresses over large dynamic ranges. A further application for the present invention is as a motion detector which can be utilized to detect or sense motion such as vibration or other displacements. In any of the above applications, the principles and components which make up and define the invention can be altered to fit the particular application. For example, the invention may be used either as an essentially symmetrical accelerometer that provides a differential output for measurement with automatic nulling in the absence of acceleration, or as a one sided force measurement sensor with temperature or acceleration compensation provided by the second of the electrode-probe elements.

In a first preferred embodiment, the present invention is disclosed as an accelerometer which experiences inertial and gravitational forces as a result of acceleration of the body or system to which the device is attached. In an accelerometer, the test masses are be subject to these inertial or gravitational forces which tend to displace the masses. The sensing mechanisms used in accordance with the present invention sense the initial movement and through monitoring means, drive the probe and electrodes to a constant distance. The voltage output of the monitoring means is then provided to a differentiating means, typically a differential amplifier to provide an accurate indication of the acceleration sensed by the test masses. The forces which are generated on the test mass of the present invention are proportional to the acceleration of the body or system on which the device is mounted. Therefore, the output from the differentiating mechanism would actually be a proportional measure of the acceleration of the test body.

Figure 1:
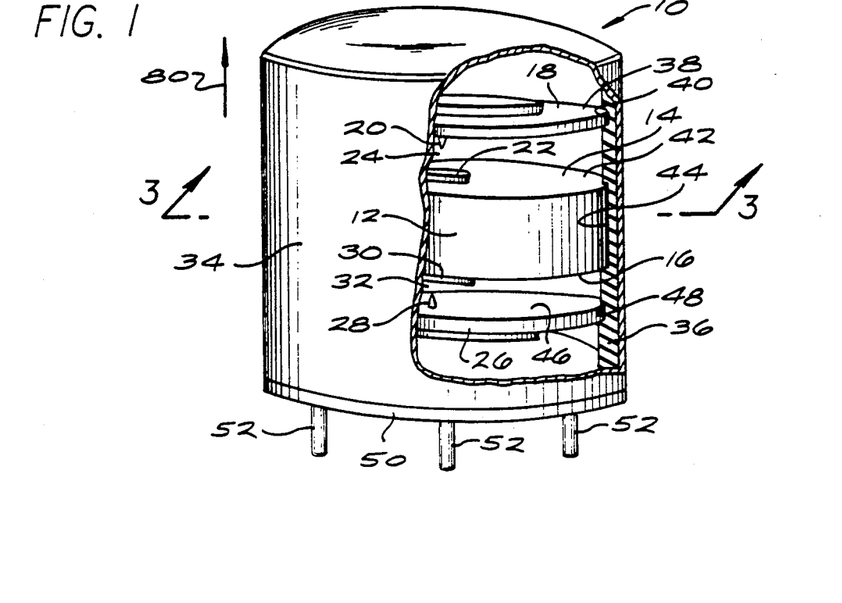
FIG. 1 is a perspective view of one embodiment of the present invention shown as an accelerometer with a partial fragmentary view showing the components that form part of the accelerometer.
Figure 2:
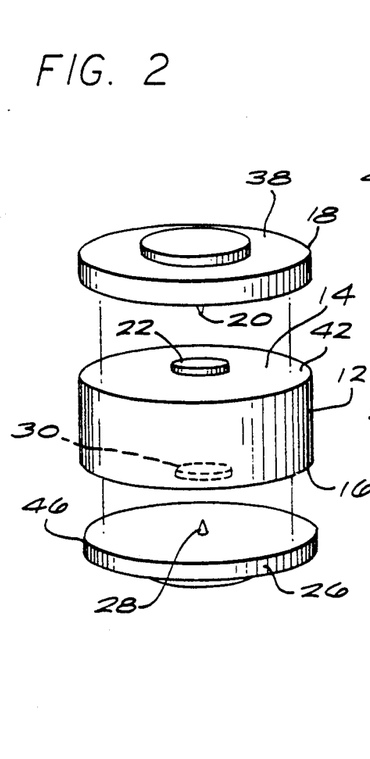
FIG. 2 is perspective view of the test mass and reference member which make up part of the embodiment shown in FIG. 1.
Figure 3:
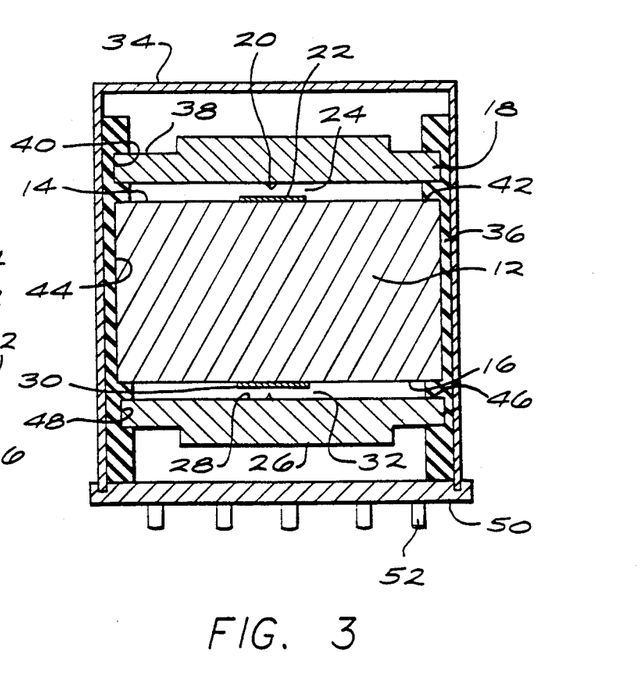
FIG. 3 is a cross-sectional side view of the embodiment shown in FIG. 1 taken along line 3—3.

Referring now to FIGS. 1, 2, and 3, a sensor 10 built in accordance with the present invention is shown as an accelerometer used to measure the acceleration of a test body or system. The sensor 10 utilizes a large reference member or mass 12 which remains stationary with respect to the other components which make up the sensor. This reference member 12 includes a first surface 14 and a second surface 16 which extends substantially parallel and opposite the first surface 14. This reference member 12 remains unaffected or uninfluenced by any forces which may be applied to the test mass used in cooperation with the present invention. This reference 12 can also be any relatively stationary support or mounting structure which again remains stationary in relation to the other components.

The sensor includes a pair of sensing mechanisms that are placed relative to the reference member 12. Each sensing mechanism utilizes a test mass which is operatively linked with an electromechanical feedback system which will be described in detail herein. Referring again to FIGS. 1 thru 3, a first test mass 18 is shown directly above the first surface 1 of the reference member 12. This test mass includes an electrically conductive means such as a probe or electrode 20 which is located directly above the first surface of the reference member. This test mass 18 is elastically restrained and is subject to inertial and gravitational forces which are generated during an acceleration. The probe or electrode 20 is located on the test mass 18 so as to keep it a constant distance away from a second probe or electrode that is located on the first surface 14 of the reference member 12. As can be seen in FIG. 3, the probe 20 and electrode 22 are maintained at a constant gap distance 24 which is critical in sensing the forces that are exerted on this particular test mass.

A second sensing mechanism which includes a second test mass 26 is located in close proximity to the second surface 16 of the reference member 12. This second test mass is also elastically suspended near this second surface and is subjected to the same accelerating forces that the first test mass is subjected to. The second test mass 26 also includes a probe or electrode 28 which is kept in close proximity to probe or electrode 30 located on the second surface of reference member. This second probe 28 and electrode 30 are also maintained a constant distance 32 apart as is shown in FIG. 3. Both test mass 18 and 26 are operatively linked to electromechanical feedback loop systems which maintain this constant gap between the probe and electrodes.

In the preferred form of the invention, each of the test masses 18 and 26 must be mounted on some means for moving the mass and its respective probe with relationship to the electrodes on the reference member in order to maintain the constant distance between probe and electrode. In the embodiments shown in FIGS. 1 through 3, each test mass is actually an electromechanical component which is operatively linked to a feedback loop circuit (described below) which helps maintain the proper distance between the probe and electrode. For example, each test mass can be an electromechanical component such as a piezoelectric component, such as a unimorph. A unimorph is a well-known cylindrically piezoelectric component which is highly responsive and deflects or moves in response to an applied voltage. This particular unimorph has a drive point substantially at its center to attain maximum deflection when subject to a known voltage. For this reason, each probe is mounted substantially in the center of the test mass. In operation, the test mass unimorph will be driven in order to maintain the constant distance between the probe and electrode.

Each probe, electrode, and test mass unimorph has terminals (not shown in FIGS. 1 through 3) which are hooked up directly to an electrical feedback circuit (see FIG. 5) which controls the particular unimorph. This feedback circuit forms part of the electromechanical system that maintains the constant current and distance between each probe and electrode.

Each test mass, 18 and 26, and the reference member 12, are located within a thermally conductive and mechanically protective housing 34 which shields these components from the outside environment. The housing includes an outer rigid support structure 36 which supports each of the components along their peripheral edges. For example, the first test mass 18 includes an outer or peripheral edge 38 which it placed within a continuous slot 40 which is formed in the outer support structure 38. This slot 40 helps maintain the test mass in place and in relation to the reference member 12. The test mass is still elastically supported since, due to its symmetrical structure, it can be deflected by a force such as those produced during an acceleration. The reference member 12 also includes a peripheral edge 42 which is engaged in a larger slot 44 formed on this outer support structure 38. It must be remembered that this reference member 12 must remain stationary and unaffected by a force which could be acting on it along with the other two test masses. For this reason, the rigid outer support structure 36 must maintain this reference member stationary and uninfluenced by any forces. For this reason, the reference member is usually much larger than each of the test masses. Lastly, the second test mass 26 includes an outer edge 46 which is retained in the continuous slot formed in the outer support structure. The particular advantageous of using a cylindrical test mass with an outer support structure will become evident later when one considers the adverse effects that can take place due to thermal fluctuations within the housing.

The housing 34 also includes a baseplate 50 having a number of external electrical terminals or pins 52 which can be plugged into a female electrical receptacle (not shown) that can be mounted directly onto the test body or system. The electronic circuitry needed to drive the components in the housing can remain external to that housing and attach to the female electrical receptacle for ease of mounting. This bottom base plate 50 also provides a proper base support for the outer support structure 36.

Figure 5:
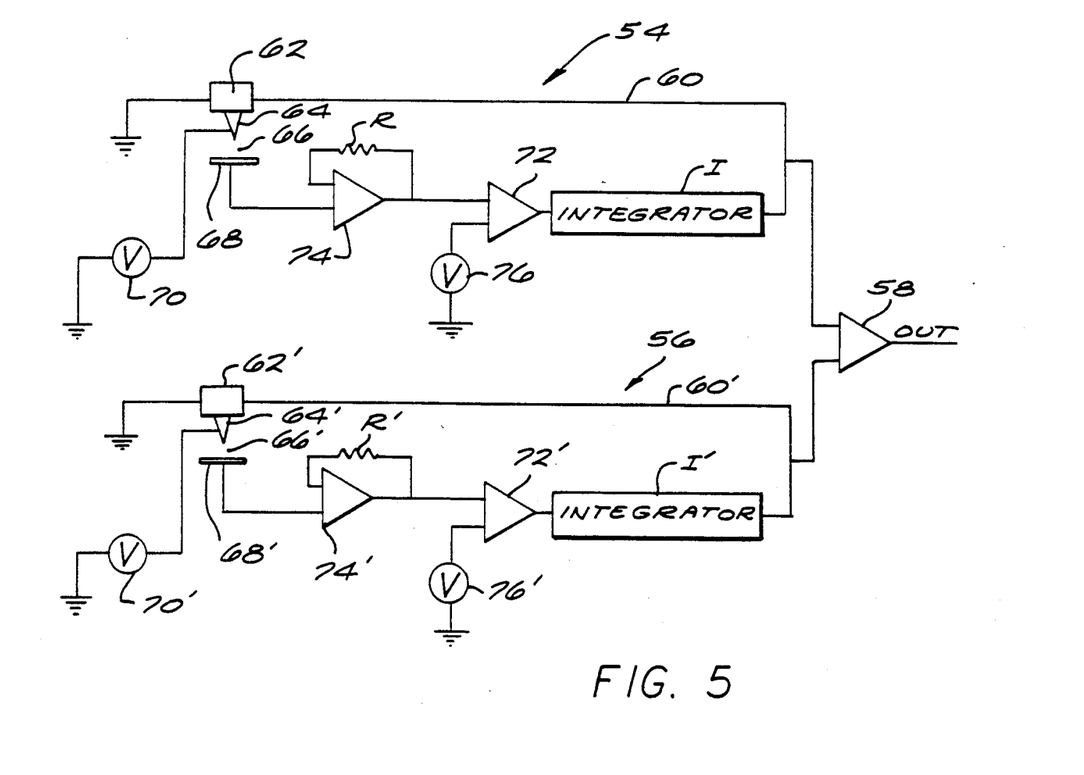
FIG. 5 is a simplified schematic of the effective feedback circuits and electromechanical components of the present invention.

Referring now to FIG. 5, the pair of electromechanical feedback systems 54 and 56 used to drive the test mass unimorphs and maintain the constant current and constant distance between probe and electrode are shown as they are attached to a means for differentiating two input signals, namely, a differential amplifier 58. Each test mass unimorph must be operatively linked with the electromechanical feedback system which includes a feedback loop used to create the current that is maintained between the probe and electrode.

In FIG. 5, the first electromechanical system 56 includes a feedback circuit 60 which is used to drive the test mass electrical unimorph designated by numeral 62. The test mass unimorph includes a probe 64 which is maintained a constant distance 66 across from a electrode 68. This electrode designates the electrode which is placed on the reference member and remains unaffected by any forces which might impinge upon the test mass.

The electrical feedback circuit includes a voltage source 70 which provides an applied voltage across the probe and electrode. The electrical feedback circuit includes a pair of amplifiers 72 and 74 arranged with a resistor R to create the circuit needed to drive the unimorph and to maintain the constant current and distance between the probe and electrode. Another voltage source 76 sets the current level between the probe and electrode. The circuit may include an integrator I which is used to help maintain the unimorph and its probe the constant distance necessary to maintain the particular electron transfer effect. The output from the integrator 10, in turn, be inputed into the differential amplifier 58. The output from the feedback loop circuit is a voltage signal which is applied to the unimorph to maintain the constant distance.

The components of the feedback loop circuit are specifically designed with each test mass unimorph to maintain a constant current along with a constant distance between the probe and the electrode. The unimorph is activated by a varying voltage which develops whenever the probe moves towards or away from the stationary mass because of an external force. In the case of the accelerometer, the force is an inertial or gravitational force. The feedback loop senses the change in distance between the probe and electrode and compensates for it by activating the unimorph to move in an equal but opposite direction in order to maintain the constant distance between probe and electrode. While the electrical circuit utilizes particular components shown in FIG. 5, any similar feedback loop circuit can be used to maintain the probe and electrode at a constant distance while producing the desired non-contact electron transfer effect.

The second test mass is also operatively linked with the second electromechanical feedback system 56 which utilizes the same circuit components as those in used in the first system 54. The similar components in the second system 56 are referenced by like numerals except that a prime ("'") has been added to each numeral or character. This second electromechanical feedback system 56 also includes a feedback circuit 60' which is used to maintain the constant current and distance between the probe 64' and electrode 68'. Similar amplifiers are used in the circuit to produce a measurable voltage change which can be inputed into the differential amplifier to obtain an output which is an indirect measurement of the force exerted on both of the test bodies. In this particular embodiment of the invention, the acceleration of the test system can be inferred from the force measurement.

It should be appreciated that each electromechanical feedback system utilizes a feedback loop circuit having a dynamic response a number of magnitudes greater than the response of the test mass-restraint combination. The use of such a high response circuit assures that each probe will be maintained at a constant distance away from the stationary electrode whenever the test masses are subjected to an external force.

For ease of manufacturing, each test mass and probe can be manufactured with a preformed gap between the probe and electrode. This preformed gap corresponds to the constant distance which will be maintained by each sensing mechanism. As a result, the feedback circuit can be designed to produce zero voltage when there are no forces acting on the test mass. It is only when the forces act on the test mass that a voltage will be generated which will drive the electromechanical component and maintain the constant distance between the probe and electrode. This voltage signal would be inputed to the differential amplifier. Alternatively, the unit can be manufactured with the probe actually touching the electrode when their is no applied voltage across the probe and electrode. The electrical feedback circuit would utilize negative feedback to activate the electrical mechanical component to move the probe a desired distance away from the electrode to maintain a constant distance and a constant current. While the circuit would be creating a measurable voltage, each voltage in the two feedback systems would be the same and would result in a zero output from the differential amplifier.

The operation of the differential force balance apparatus will now be described in greater detail. Referring specifically to the accelerometer design shown in FIGS. 1 and 3, it can be said that each test mass, 18 and 26, would be subjected to an inertial or gravitational force caused by an acceleration on which the sensor 10 is mounted. The forces act on each test mass in the same direction, however, due to the orientation of the test mass on the referenced member, different voltages will be generated in each of the two feedback loops due to the orientation. Assuming that the sensor 10 is accelerating in a direction shown by arrow 80 shown in FIG. 1, the inertial forces, or gravitational forces, would act on each test mass in an opposite direction to the accelerated direction. Therefore, the force exerted on the top test mass 18 would have a tendency to drive the mass and its probe 20 towards its corresponding electrode 22. Likewise, the force would also act on the second test mass 26 in the same direction, however, due to the opposite orientation of this test mass and probe, the force would tend to move the probe 28 away from the electrode 30. As a result, the feedback loop circuits which drive the test mass unimorphs would detect the force through the changing of the distances between the probes and electrodes. In the case of the first test mass, the constant distance would be decreasing which would result in its corresponding feedback loop to resist the force by moving or driving the unimorph to increase the distance to maintain the constant distance which is required to maintain the desired electron transmission effect. The other test mass would be creating a larger distance between its probe and electrode which would also be detected by its electromechanical system and would be compensated by driving the second test mass unimorph towards the electrode to avoid widening the distance between probe and electrode. In each case, the resulting voltage changes within the two respective circuits will be different and will result in a differentiated output when the two signals are placed into the differential amplifier.

The importance of the orientation of the test masses with respect to the reference member or structure should now become clear since the two feedback circuits do not experience the same voltage change. As a result, the voltage in one feedback circuit must be greater than the voltage in the other circuit. When the two voltages are inputed in the differential amplifier, the differences between the two voltages will be obtained. The output of the differential amplifier will actually be two times the measure of forces acting on the sensor and the corresponding body or systems which is being measured. In the case of an accelerometer, the measured force would be proportional to the acceleration of the body or system on which the sensor is mounted since the circuitry is particularly adapted to provide a calibrated output which corresponds to a reading of acceleration. In practice, the output from the differential amplifier must be divided by two in order to obtain the true magnitude of the force acting on each test mass. As a result of measuring the forces twice and summing to obtain a double measurement, the sensitivity of the apparatus is enhanced.

One of the potential disadvantages in using a sensing mechanism which can detect minute displacements between a probe and an electrode which can be as low as one angstrom, is the effect that the environment may have on the device. Thermal changes can cause unwanted expansion or contraction of the components that make up the particular apparatus. For example, if the reference member or structure is subject to thermal changes, an expansion or contraction may be detected by the electromechanical feedback systems and possibly interpreted as a measurable external force acting on the test masses.

The use of two separate test masses with their own respective electromechanical feedback systems on opposite sides of the referenced member or structure prevents unwanted thermal changes from affecting the output. For example, if the reference member is subjected to a thermal source which causes it to uniformly expand or contract, the two feedback loops would uniformly adjust for these changes by moving the two probes as needed. The resulting voltage changes in each feedback loop circuit should be the same. Whenever the new voltages are inputed into the differential amplifier, the two voltages will negate each other, resulting in no measurable output due to displacement caused by thermal expansion or contraction.

Likewise, it is possible for the test mass themselves to expand or contract when subjected to a high thermal source. Again, however, if the expansion or contraction is uniform due to a uniform source, any contraction or expansion experienced by the masses would again create similar voltage changes in the two feedback loop systems which would again cancel each other out. In order to evenly distribute any thermal change that can occur within the sensor, the housing is preferably made from a material having high thermal conductivity which will evenly distribute any thermal change within the interior compartment of the housing. As a result, if expansion or contraction does occur in any of the components, it will preferably be a uniform change will not be detected as an external force.

The particular advantageous and benefits gained by using a symmetrical shape for the apparatus, as shown in FIGS. 1 through 3, relate generally to the increased thermal compensation that a symmetrical assembly provides the apparatus. Referring again to the accelerometer shown in FIGS. 1 through 3, any thermal expansion or contraction of the reference member would be symmetrically distributed throughout the entire outer support structure 36. This outer support structure which supports the reference member and the test masses, allow the test masses to move up or down with the reference member if it should expand or contract due to exposure to a high thermal change. As a result, the distance between the probe on each test mass and the electrode would remain undisturbed by any displacement caused by thermal changes. Therefore, the two feedback circuits would not detect the movement and would compensate it by driving the two test mass unimorphs. This particular feature shows the desirability in using symmetrical components in the present invention.

This outer support structure also compensates for uneven thermal expansion that can result if only a portion of the device is subjected to a sudden thermal change. This outer support structure would still allow test mass to move with the reference member or structure if it only partially contracted or expanded on one side. For example, if only the top portion of the reference member is subjected to thermal expansion, then the top test mass would move a correspondingly same distance with the expansion. Therefore, the distance between the probe and its corresponding electrode would remain unchanged and would not activate the electromechanical feedback system which would otherwise detect a displacement as a possible external force. The bottom test mass would remain unmoved and there would be no output caused by the expansion. Therefore, by utilizing the symmetrical components as shown in FIGS. 1 through 3, beneficial temperature compensating means can be gained. Also, due to the symmetrical shape of the test masses, any displacement of the test mass and its probe would be uniform and would be more easily detected by the feedback circuit. The two masses would then achieve more accurate readings of the external forces which could impinge on them.

Figure 4A:
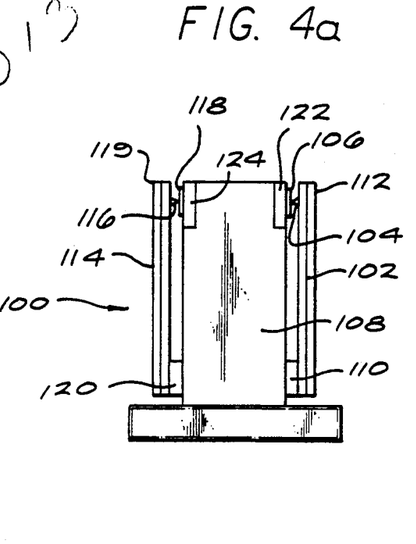
FIG. 4a is a side elevational view of another embodiment of the present invention showing the device before a voltage is applied across the probe and electrode.
Figure 4B:
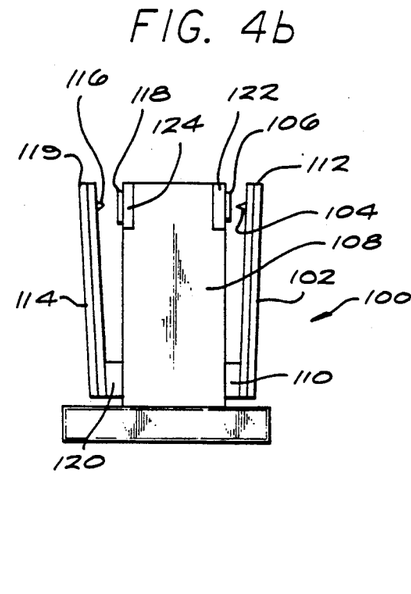
FIG. 4b is a side elevational view of the same embodiment shown in FIG. 4a illustrating an exaggerated view of the probe and electrode after a voltage is applied.

Another embodiment which incorporates the principals of the present invention is shown in FIGS. 4a and 4b. This apparatus 100 can be similarly used as an accelerometer since it can detect forces which are generated by acceleration. Additionally, this particular embodiment can also be used, for example, as a motion detector for detecting unwanted motions such as vibrations or any similar unwanted displacement.

Referring initially now to FIG. 4a, an embodiment 100 of a force balance apparatus is shown including a first test mass 102 which includes a probe 104 that is in contact with a electrode 106 found on a reference structure or member 108. The test mass 102 takes the form of a cantilever beam which is mounted onto a mounting element 11 located on the reference member 108. The test mass 102 again can be an electromechanical component, such as the disclosed cantilever beam, which is made from a piezoelectric bimorph that is well-known in the art. This test mass or cantilever beam 102 has a drive point near its free end 112 and has the probe 104 attached near that end to attain maximum displacement if necessary.

The opposite side of the reference member 108, shows another test mass 114 having a probe 116 attached thereto. This test mass 114 may also be a cantilever beam component which again be an electromechanical component such as a bimorph. The probe 116 is placed in direct contact with a electrode 118 which is mounted onto the reference member 108. The test mass 114 is in turn mounted onto a mounting element 120 which is similar to the mounting element found on the other side.

Each cantilever beam test mass is connected to an electromechanical feedback system such as the one depicted in FIG. 5. These electromechanical feedback systems operate in the same manner to drive the cantilever beam bimorphs by applying a voltage which moves the free end of each beam either toward or away from the reference member. In this fashion, the test masses will each experience a similar force acting on them. Each test mass is again placed on opposite sides of the reference member in order to create the differentiating feature which provides the advantageous features described above.

Initially, the probes and electrodes in FIG. 4a are shown when there is no current applied to the feedback loop circuits that drive each bimorph. Referring now to FIG. 4b, each probe on the cantilever beam is shown moved away from its corresponding electrode. This position is achieved by applying a voltage to each of the cantilever beams which move the probe to the desired distance away from the electrode. The feedback loop circuits actually create negative feedback which enables the bimorphs to move the probes outward away from the electrodes. Once the components are in this operating position, then each electromechanical feedback system will operate to respond to any force experienced on the test mass.

Again, the two feedback loop circuits would be designed so that when their voltage signal is inputed into the differential amplifier, each voltage will cancel each other out to obtain a zero output reading during non-acceleration. When the test mass moves due to an acceleration, the voltages in each feedback loop circuit will be different and will result in the differential amplifier producing a measurable output.

The embodiment shown in FIGS. 4a and 4b operate in the same fashion as the accelerometer embodiment shown in FIGS. 1 through 3. Again, if the test masses are subjected to an external force, one probe will move towards its corresponding electrode and the other probe will move away, in each case, the constant distance between the probe and electrode will be changed. Again, the electromechanical feedback loop system senses the changing distance between the probe and electrode and instantaneously compensates for it by applying a voltage across the electromechanical component to maintain the constant gap.

The embodiment of the invention shown in FIG. 4a and 4b also possesses the advantageous thermal compensating feature found in the previously described embodiment. This apparatus 100 compensates for uniform thermal expansion or contraction by virtue of the differentiating concept used in accordance with the present invention. For example, if the reference member should expand uniformly, each probe will move a similar amount either towards or away from its corresponding electrode. As a result, the electromechanical system will compensate for this change by driving the cantilever beam which moves the probes back to the initial gap distance. The corresponding change in voltage in the two feedback circuits would be the same as a result of such a uniform thermal change.

Due to its unsymmetrical configuration, the embodiment shown in FIG. 4a and 4b requires additional thermal compensating means to compensate for uneven temperature changes. For example, if the reference member is subjected to a thermal change which affects only its right side, then the expansion will cause the probe on the right cantilever beam to move away from its corresponding electrode. The other test mass cantilever beam would not experience this same displacement and the electromechanical system servicing this test mass would not react. Therefore, when the voltage change is inputed into differential amplifier with a zero voltage input from the other circuit, a measurable output will be obtained. This output could be interpreted as an external force acting on the apparatus when in fact it is not.

This embodiment 100 compensates for this by utilizing a mounting element 122 directly beneath the electrode 106 found on the reference member. This element is made from the same material as the mounting element 112 so that if the mounting element 110 should expand or contract due to a thermal change, its corresponding element 122 will also change in a similar fashion. In this respect, the probe and electrode will be moved with one another to maintain the constant gap therebetween. Likewise, another element 124 incorporated into the reference member 108 is found directly adjacent to the electrode 118. Similarly, this element is made from the same material and has the same size as the mounting element 120 upon which the second test mass is mounted.

Figure 6:
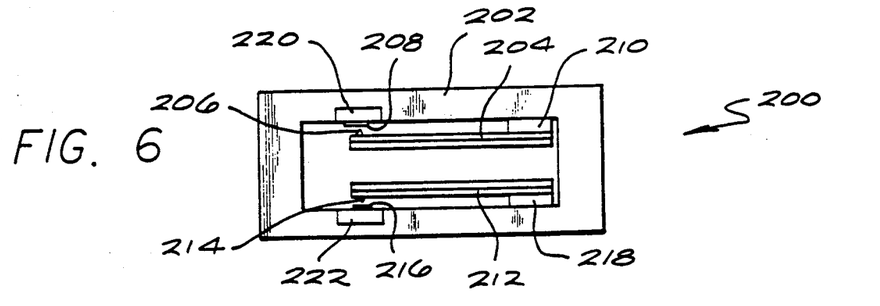
FIG. 6 is a side elevational view of another embodiment of the present invention.

A variety of alternative embodiments of the present invention can be created without departing from the spirit and scope of the invention. In FIG. 6, an alternative apparatus 200 includes an outer reference member 202 which again is unaffected by an external force. A first test mass 204 which again takes the form of a cantilever beam which may in fact be the electromechanical component used for the sensing mechanism. This first test mass 204 includes a probe 206 which is maintained a specific distance away from a electrode 208 found on the reference member 202. The test mass 204 is mounted on a mounting element 210 which can serve to provide a means for creating a preformed gap between the probe and electrode.

A second test mass 212, again in the form of a cantilever beam, includes a probe 204 which is maintained a constant distance away from its corresponding electrode 216. This test mass 204 is also mounted on to a mounting element 218 which is attached to the reference member 202.

Each test mass is connected to a electromechanical feedback system as is shown in FIG. 5 which is in turn connected to the differential amplifier which is also shown in FIG. 5. This apparatus senses forces that are generated on each test mass in the same manner as the embodiment shown in FIG. 4a and 4b. Uniform thermal changes are again compensated by use of the differentiating feature of the present invention. A mounting element 220 is formed with the reference member which is again used to compensate for uneven thermal changes that can affect the components making up the present invention. A similar mounting element 222 is located directly beneath the second electrode 216 to compensate for uneven thermal changes that may affect the second test mass.

Figure 7:
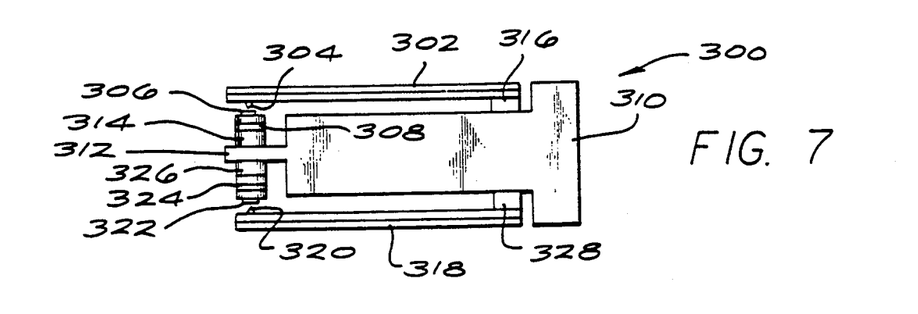
FIG. 7 is side elevational view of another embodiment of the present invention.
Figure 8:
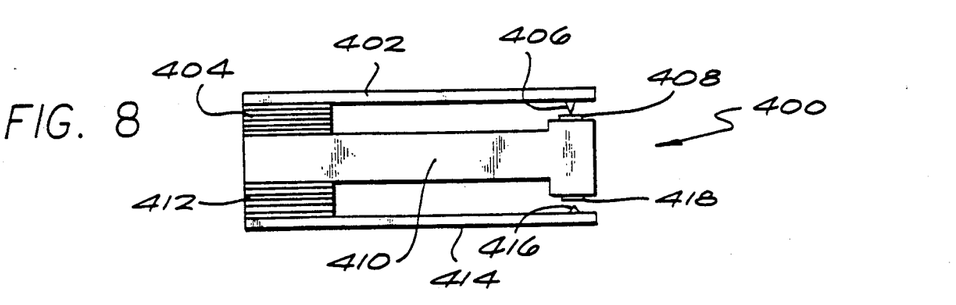
FIG. 8 is a side elevational view of another embodiment of the present invention.

FIG. 7 shows another variation of the sensor apparatus which again uses the same principles described above. In FIG. 8, the apparatus 300 includes a first test mass 302 taking the form of a cantilever beam and further including a probe 304 that is placed substantially near the end of the beam. A electrode 306 is affixed to a stack of piezoelectric components 308, such as unimorphs. These unimorphs are attached to a reference member 310 which has a protruding fin 312 upon which the piezoelectro unimorphs are stacked on. A mounting element 314 used to compensate for uneven thermal changes is found between the stack of piezoelectrical components and the fin 312. The test mass 302 is mounted on a similar mounting element 316 which is attached to the reference member.

A second test mass 318 is located on the opposite side of the reference member, and takes on the same cantilever beam shape as the other test mass. This test mass includes a probe 320 located near its free end which is maintained a constant distance away from a electrode 322 which is also located on a stack of piezoelectric elements 324. A similar mounting element 326 is placed between the stack of piezoelectrical components and the projecting fin 312. This mounting element 326 and its corresponding mounting element 328, upon which the test mass is mounted, also compensates for uneven thermal changes as described in the above embodiments.

Each test mass 302 and 318 are connected to a separate electromechanical feedback system which activates the cantilever beam upon the application of an external force. The stack of piezo elements is primarily used as a means for initially moving the electrode the desired distance away from the probe during non-acceleration. These piezoelectric elements are driven by a separate circuit (not shown) and remain unactivated once the desired gap between probe and electrode has been initially obtained.

FIG. 8 shows yet another embodiment of the present invention. In this figure, the apparatus 400 includes a first test mass 402 which is attached to a stack of electromechanical components 404, usually piezoelectrical elements such as unimorphs or bimorphs. The test mass includes a probe 406 located along its free end which is kept a constant distance away from a electrode 408. This electrode 408 is placed directly on a reference member 410 upon which the stack of electromechanical components are mounted.

The opposite side of the reference member also has a stack of electromechanical components 412 attached thereto. A second test mass 414 is attached to this stack of components and has a probe 416 attached to its free end. This probe is also maintained a constant distance away from a electrode 418 found on the reference member.

In this particular embodiment, the test masses 402 and 414 need not be electromechanical components as has been described in the above embodiments. Rather, it can be a material of any mass which could also be susceptible to external forces. The piezoelectric components are attached to the electromechanical feedback system in order to maintain the constant distance between the probe and electrode as has been previously described above. This embodiment compensates for uniform thermal variations by using the differentiating feature of the present invention.

Figure 9:
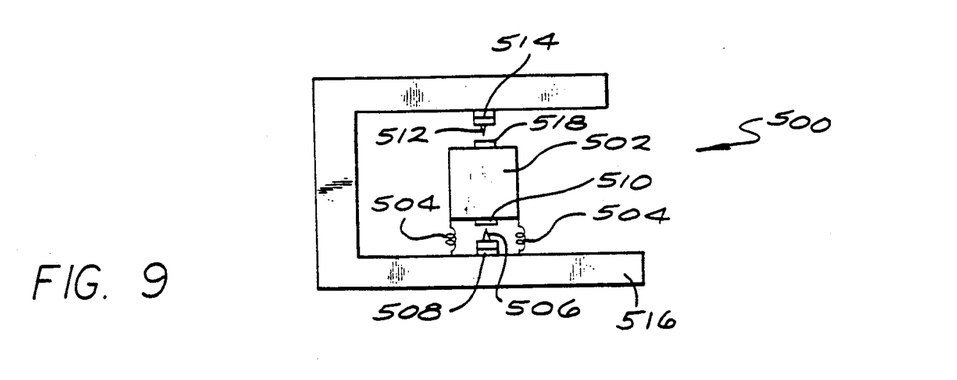
FIG. 9 is a side elevational view of another embodiment of the present invention.

FIG. 9 shows yet another embodiment which utilizes a variation of the principles of the present invention in order to measure external forces indirectly by measuring a displacement of an elastically restrained test mass. Referring now to FIG. 9, the apparatus 500 includes a single test mass 502 which is elastically restrained by elastic restraining means such as springs 504 found in each corner of the test mass. The test mass may have many more springs which support it or it may utilize any other restraining system which will produce a displacement of the mass when it is subjected to a force.

The apparatus further includes a movable probe 506 which is mounted on a stack of electromechanical components 508 such as unimorphs. This probe 506 is maintained a constant distance away from electrode 510 found on one side of the test mass. The stack of electromechanical components acts as a means for moving the probe towards or away from the electrode 510 when the test displaces due to an applied external force.

A similar probe 512 is found on a stack of electromechanical components 514 which is mounted on a rigid outer housing 516 which is used to support the components of the present invention. This probe 512 is also maintained a constant distance away from a electrode 518 found on the outer side of the test mass 502.

Each probe, electrode and corresponding electromechanical component is attached to a feedback loop system similar shown to the one shown in FIG. 5. This embodiment differs somewhat from the other embodiments in that only one test mass is utilized to measure differential forces that are generated on it. Each feedback loop circuit which services the respective probe and electrodes produce a voltage signal which can be inputed into a differential amplifier to obtain a measure of the force acting on the test mass. In the case of an acceleration, the output would be proportionate to the acceleration of the body or system on which the apparatus is mounted.

It should be appreciated that the alternative embodiments shown in FIG. 4, 6, 7, 8, and 9 can also be housed within a protective casing or similar housing as shown in FIGS. 1 through 3. This protective housing can also include a base member which has terminals which allows the probes, electrodes, and electromechanical components to be connected to the external circuitry.

From the above, it can be seen that the present invention provides a force balance apparatus which has substantial improvement over existing devices due to the differentiating feature incorporated into the invention. This results in a more sensitive and accurate apparatus which can be made in a small package and used in extremely demanding applications such as military and aerospace systems. Furthermore, the invention can be utilized for a number of different applications, for example, such as an accelerometer as was described above. Due to its rather simple structure, the present invention can be more easily produced and used in many more applications than conventional prior art devices.

While particular forms of the invention have been illustrated and described, it will be apparent to those skilled in the art that various modifications can be made to the described embodiments without departing from the spirit and scope of the invention. Accordingly, it is not intended that this invention should be limited except by the appended claims.

What is claimed is:

1. A force balance apparatus comprising:
    a first test mass including a first electrically conductive means for conducting an electrical current;
    second electrically conductive means for conducting an electrical current spaced apart from and in close proximity to said first electrically conductive means;
    first current means for providing an electrical current between said first and second electrically conductive means by way of non-contact electron transfer mechanism;
    first maintaining means cooperative with said first current providing means for maintaining said first electrically conductive means a constant distance from said second electrically conductive means, said first maintaining means having a measurable voltage when maintaining the constant distance between said first and second electrically conductive means;
    a second test mass including a third electrically conductive means for conducting an electrical current;
    a fourth electrically conductive means for conducting an electrical current spaced apart from and in close proximity to said third electrically conductive means;
    second current means for providing an electrical current between said third and fourth electrically conductive means by way of non-contact electron transfer mechanisms;
    second maintaining means cooperative with said second current providing means for maintaining said third electrically conductive means a constant distance from said fourth electrically conductive means, said second maintaining means having a measurable electrical voltage when maintaining the constant distance between said third and fourth electrically conductive means; and
    means for differentially measuring the voltages of said first and second maintaining means.

2. The apparatus as defined in claim 1 wherein said means for differentially measuring said voltages of said first and second maintaining means comprise a differential amplifier.

3. The apparatus as defined in claim 1 wherein said first maintaining means and first current providing means comprise:
    an electromechanical component operatively linked with said first electrically conductive means to move said first electrically conductive means in response to an electrical signal; and
    a feedback loop circuit operatively linked with said electromechanical component for maintaining a constant distance between said first and second electrically conductive means, said loop circuit being responsive to current changes existing between said first and second electrically conductive means.

4. The apparatus as defined in claim 3 wherein said electromechanical component is a piezoelectric component.

5. The apparatus as defined in claim 3 wherein said electromechanical component defines said first test mass.

6. The apparatus as defined in claim 3 wherein said second maintaining means and second current providing means comprise:
    a second electromechanical component operatively linked with said third electrically conductive means to move said third electrically conductive means in response to an electrical signal; and
    a feedback loop circuit operatively linked with said electromechanical component for maintaining a constant distance between said third and fourth electrically conductive means, said loop circuit being responsive to current changes existing between said third and fourth electrically conductive means.

7. The apparatus as defined in claim 6 wherein said second electromechanical component is a piezoelectrical component.

8. The apparatus as defined in claim 6 wherein said second electromechanical component comprises said second test mass.

9. The apparatus as defined in claim 1 wherein said first and second test masses are positioned with respect to each other such that a force acting on the apparatus will cause movement of said first electrically conductive means relative to said second electrically conductive means that is opposite to movement of said third electrically conductive means relative to said fourth electrically conductive means.

10. The apparatus as defined in claim 9, further including a stationary reference member having first and second substantially parallel surfaces, said second electrically conductive means being placed on said first surface and said fourth electrically conductive means being placed on said second surface.

11. The apparatus as defined in claim 10 wherein said stationary reference member is disposed between said first and second test masses.

12. A force measurement apparatus which comprises:
    a first element incorporating a first electrode;

a second electrode in a spaced-apart relationship to said first electrode;

means for causing a current to exist between said first and second electrodes by non-contact electron transfer mechanisms;

first distance maintenance means for maintaining the distance between said first and second electrodes at a constant value, said first maintenance means having a measurable electrical property when maintaining the distance at the constant value;

a second element incorporating a third electrode;

a fourth electrode in spaced apart relationship to said third electrode;

means for causing a current to exist between said third and fourth electrodes by non-contract electron transfer mechanisms;

second distance maintenance means for maintaining the distance between said third and fourth electrodes at a constant value, said second maintenance means having a measurable electrical property when maintaining the distance at the constant value; and means for measuring the electric properties of said first and second distance maintenance means.

13. The apparatus as defined in claim 12 wherein said first element and second element are oriented such that a force acting on the apparatus will cause movement of said first electrode relative to said second electrode that is opposite to movement of said third electrode relative to said fourth electrode.

14. The apparatus as defined in claim 13 wherein said first maintenance means is responsive to any changes of current between said first and second electrodes and said second maintenance means is responsive to any changes of current between said third and fourth electrodes.

15. A force balance apparatus comprising: I a first elastically-suspended member having a first electrically conductive means;

a reference member having first and second surfaces that are substantially parallel to each other;

a second electrically conductive means located on said first surface of said reference member that is spaced apart and in close proximity to sai first conductive means, said first elastically-suspended member being suspended relative to said reference member to cause movement of said first conductive means relative to said second conductive means when said first elastically-suspended member is subjected to a force;

first current providing means for providing a current flow between said first and second conductive means by way of noncontact electron transfer mechanisms;

first maintaining means operatively linked with said first current providing means for maintaining said first conductive means a constant distance from said second conductive means, said first maintaining means including electrical means having a measurable electrical property when said first maintaining means operates;

a second elastically-suspended member having a third electrically conductive means;

a fourth electrically conductive means located on said second surface of said reference member that is spaced apart and in close proximity to said third conductive means, said second elastically-suspended member being suspended relative to said reference member to cause movement of said third conductive means relative to said fourth conductive means when said second elastically-suspended member is subjected to a force;

second current providing means for providing a current flow between said third and fourth conductive means by way of noncontact electron transfer mechanisms;

second maintaining means operatively linked with said second current providing means for maintaining said third conductive means a constant distance from said fourth conductive means, said second maintaining means including electrical means having a measurable electrical property when said second maintaining means operates; and means for differentially measuring the electrical properties of said first and second maintaining means.

16. The apparatus as defined in claim 15 wherein said first and second elastically suspended members are oriented such that a force acting on the apparatus will cause movement of said first conductive means relative to said second conductive means that is opposite to movement of said third conductive means relative to said fourth conductive means.

17. The apparatus as defined in claim 16 wherein sai first and second elastically-suspended members comprise piezoelectric components.

18. The apparatus as defined in claim 17 wherein said reference member is disposed between said first and second elastically-suspended members.

19. The apparatus as defined in claim 18 wherein said first and second elastically-suspended members and said reference member are symmetrical.

20. The apparatus as defined in claim 18 wherein said first and third conductive means are probes.

* * * * *